(12) United States Patent
Nochta (10) Patent No.: US 7,974,415 B2
(45) Date of Patent: Jul. 5, 2011

(54) SYSTEM AND METHOD FOR UPDATING KEYS USED FOR PUBLIC KEY CRYPTOGRAPHY

(75) Inventor: Zoltan Nochta, Karlsruhe (DE)

(73) Assignee: SAP AG, Walldorf (DE)

( * ) Notice: Subject to any disclaimer, the term of this patent is extended or adjusted under 35 U.S.C. 154(b) by 1123 days.

(21) Appl. No.: 11/499,090

(22) Filed: Aug. 4, 2006

(65) Prior Publication Data

US 2007/0116269 A1    May 24, 2007

(30) Foreign Application Priority Data

Aug. 5, 2005 (EP) ..................... 05017140

(51) Int. Cl.
*H04K 1/00* (2006.01)
(52) U.S. Cl. .................. 380/277; 380/273; 380/278
(58) Field of Classification Search ............... 380/279, 380/44; 713/156, 175
See application file for complete search history.

(56) References Cited

U.S. PATENT DOCUMENTS

| | | | | |
|---|---|---|---|---|
| 5,144,665 A * | 9/1992 | Takaragi et al. | ............... | 380/30 |
| 6,377,692 B1 * | 4/2002 | Takahashi et al. | ............ | 380/277 |
| 7,228,434 B2 * | 6/2007 | Zisowski | ................. | 713/187 |
| 7,516,330 B2 * | 4/2009 | Ellison et al. | ................ | 713/180 |
| 7,519,821 B2 * | 4/2009 | Wheeler et al. | ............... | 713/176 |
| 2003/0097566 A1 * | 5/2003 | Kumagai et al. | .............. | 713/175 |
| 2003/0163701 A1 * | 8/2003 | Ochi et al. | .................... | 713/175 |
| 2005/0033957 A1 * | 2/2005 | Enokida | ....................... | 713/156 |
| 2005/0120203 A1 * | 6/2005 | Yeh et al. | ........................ | 713/156 |
| 2005/0273852 A1 * | 12/2005 | Ferlitsch | .......................... | 726/17 |
| 2006/0239451 A1 * | 10/2006 | Evans et al. | ..................... | 380/44 |
| 2008/0114984 A1 * | 5/2008 | Srinivasan et al. | ............ | 713/175 |

FOREIGN PATENT DOCUMENTS

| | | |
|---|---|---|
| EP | 0898260 A1 | 2/1999 |
| WO | 2005055514 A1 | 6/2005 |

OTHER PUBLICATIONS

Feghhi (Jalal Feghhi, Jalil Feghhi, Peter Williams, Digital Certificates Applied Internet Security, 1999, ISBN: 0201309807), p. 61-89.*
Stallings (William Stallings, "Cryptography and network security", 2th edition, 1998, ISBN: 0138690170), p. 299-314.*
Extended EP Search Report for EP Application No. 05017140.4, mailed Dec. 19, 2005, 4 pages.

* cited by examiner

*Primary Examiner* — Peter Poltorak
(74) *Attorney, Agent, or Firm* — Brake Hughes Bellermann LLP (57) ABSTRACT

A provider system is disclosed for providing a sequence of public keys to a receiver system, wherein each public key of the sequence is related to a private key and is applicable for a public key cryptography procedure. The provider system can include a computing unit and a sending unit. The computing unit can be configured to generate the sequence of public keys and related keys and compute a plurality of data sets, where a data set of the plurality of data sets includes a public key and a proof value. The proof values can result from applying a hash function to a following data set that includes a further public key following in the sequence. The sending unit can be configured to provide the plurality of data to a receiver system.

19 Claims, 6 Drawing Sheets

Sequence of 2 public keys: PuK(1), PuK(2)
   with update data: UD(1)
   and proof value: PV(1) = h( PuK(2) )
                                                                                310

Data set 1:   { PuK(1), UD(1), PV(1) }                              311

Data set 2:   { PuK(2) }                                            312
                                                                                313
Comparison: PV(1) <-> H, with H = h( PuK(2) )

---

Sequence of n public keys: PuK(1), ... PuK(i), PuK(i+1), ...PuK(n),
   with update data: UD(1), ... UD(i), UD(i+1), ... UD(n)
   and proof value: PV(1) = h( PuK(2), UD(2), PV(2) ),
                    PV(2) = h( PuK(3), UD(3), PV(3) ), ...
                    PV(i) = h( PuK(i+1), UD(i+1), PV(i+1) ), ...
                    PV(n-1) = h( PuK(n) )
                                                                                320

Data set 1:   { PuK(1), UD(1), PV(1) }                              321

Data set 2:   { PuK(2), UD(2), PV(2) }                              322
                                                                                323
Comparison: PV(1) <-> H, with H = h( PuK(2), UD(2), PV(2) )

Data set i+1: { PuK(i+1), UD(i+1), PV(i+1) }                        324
                                                                                325
Comparison: PV(i) <-> H, with H = h( PuK(i+1), UD(i+1), PV(i+1) )

Data set n:   { PuK(n) }                                            326
                                                                                327
Comparison: PV(n-1) <-> H, with H = h( PuK(n) )

Fig.3

Sequence of 2 public keys: PuK(1), PuK(2)
    with signature values: SV(1) = Sign_PrK(1) ( h( PuK(1), UD(1), PV(1) ) )
                                    SV(2) = Sign_PrK(2) ( h( PuK(2) ) )
    with update data: UD(1)
    and proof value: PV(1) = h( PuK(2) )

Data set 1: { PuK(1), UD(1), PV(1) }  ⟋ 331
    with: SV(1)

Comparison: h( PuK(1), UD(1), PV(1) ) <-> H',
         with H' = Verify_PuK(1) ( SV(1) )

Data set 2: { PuK(2) }  ⟋ 333      332
    with: SV(2)

Comparison: PV(1) <-> H, with H = ( PuK(2) )
    and: h( PuK(2) ) <-> H',
        with H' = Verify_PuK(2) ( SV(1) )

SYSTEM AND METHOD FOR UPDATING KEYS USED FOR PUBLIC KEY CRYPTOGRAPHY

CLAIM OF PRIORITY

This application claims priority under 35 U.S.C. §119 to European Patent Application Number: 05017140.4, filed on Aug. 5, 2005, the entire contents of which is hereby incorporated by reference.

TECHNICAL FIELD

This description relates generally to the field of electronic data processing and specifically to providing secure electronic transactions.

BACKGROUND

In today's world, electronic communication has reached a high level. Many parties, for example private persons, companies and official agencies, use electronic infrastructures such as the internet for communication. Frequently, it is desired that an electronic transaction, that is, an electronic exchange of data, be secure. Secure transactions may mean, for example, that a sender of a document can be identified in a reliable way or that the document is not readable by an unauthorized person intercepting a transmission of the document.

A very efficient way to provide aspects of the secure electronic transactions is the use of public key cryptography (PKC). PKC involves a PKC method and a pair of complementary keys that include a public key and a private key related to the public key. The PKC method and the keys may be selected so that it is impracticable to determine one of the complementary keys based on knowledge of the further complementary key. Examples for PKC methods or algorithms are RSA, named after inventors of the method, Rivest, Shamir, and Adelman or ElGamal. Usually, the public key is given to one or more parties and the private key is kept securely by one party and made inaccessible to a further party. Data in an electronic format can be encrypted using the PKC method and either the public key or the private key. Decryption of the encrypted data requires applying the PKC method with the complementary key to restore the data. Generally, PKC is considered to be secure. This means, the PKC method and the length of the complementary keys may be selected so that breaking the PKC may take a long time, for example more than 1000 years with today's available knowledge and computing resources.

Two basic applications for a procedure using the PKC are encryption and signing. An example of encryption is when a first party that is provided with a public key uses the public key for encrypting a document. The document is sent to a second party, and the second party decrypts the encrypted document with the private key. An example for signing is when a first party sends a message together with a signature. The signature is computed by encrypting data representing the message with the private key. A second party receiving the message and the signature may decrypt the signature with a public key that has been provided to the second party. The second party may compare the decrypted signature to the representation of the message and in case of identity may conclude that the signature has been computed by the first party that owns the authentic private key.

The PKC procedure relies on the fact that a party receives a public key and that the public key is provided by an authentic providing party. The PKC procedure may not be secure in case that a non-authentic party provides a non-authentic public key, even if the PKC method is secure. In the example of the encryption application, the non-authentic party may be able to read the document encrypted with the public key because the non-authentic party owns the related private key. In the example of the signing application, the non-authentic party may be able to send a non-authentic message with a signature that leads to a false conclusion that the message has been sent by the authentic party.

SUMMARY

Methods and apparatuses are disclosed for securely transmitting a sequence of public keys from a provider system to a receiver system. A used public key may not be secure anymore or because the used public key may be scheduled to be updated. A reason that the used public key may not be secure may be, for example, that the used public key has been compromised by an access of an unauthorized person. A further reason may be that due to new technical developments the used key does not provide a required security level against breaking the PKC procedure.

In a first general aspect, a system is adapted for securely providing a sequence of the public keys. The secure provision is a part of the secure way to transmit the sequence of the public keys. The providing system has a computing unit and a sender unit. The computing unit generates the sequence of the public keys and computes data sets that enable the secure provision of the sequence. The data sets are related to the public keys of the sequence so that providing a further public key to replace a used public key is secure, that is, a relationship between the further public key and a previously provided data set is secure. Generally, a secure relationship is impractical to break with today's knowledge and computing resources. The relationship is secure even in case that the used public key or the private key related to the used public key is insecure. In such a case the used public key or the private key are not available for a secure way to provide the further key. Due to the relationship the further key can be provided securely in an automated way. The automated way is fast and efficient regarding the provider system and a communication channel connected to the sending unit because the further public key may be provided using only a single message. Furthermore, the single message may be short with few overhead data, that is, data of the data set providing the security may be comparable in size to the further public key. Further, one communication channel can be used for providing the sequence of the public keys without, for example, for providing data by an email to an authorized person to perform a manual activity.

In another general aspect, a receiver system for authenticating public keys of the sequence can securely authenticate public keys received from a providing system. The secure authentication can be part of the secure way to transmit the sequence. The receiving system has a receiving unit and an authentication unit. The receiving unit receives the data sets, and the authentication unit authenticates the further public key by using the secure relationship between the further public key and the previously provided data set. The previously provided data set is received by the receiver unit prior to a data set including the further public key. A positive authentication result confirms that the further public key is secure and therefore applicable for a secure public key cryptography procedure. Thus, public keys can be authenticated in an automated way that is fast and efficient because only one message with few overhead data has to be processed. Further, the receiving unit may be only connected to one communication channel.

In another general aspect, a computer implemented method (e.g., as executed by a computer program) can provide the sequence of the public keys in a secure way. The sequence is generated, a data set is provided, and a following data set is provided.

In another general aspect, a computer implemented method (e.g., as executed by a computer program) can authenticate the public keys of the sequence in a secure way. A data set is received, a following data set is received, a test hash value is computed, and a following key of the following data set is authenticated.

DETAILED DESCRIPTION

Figure 1:
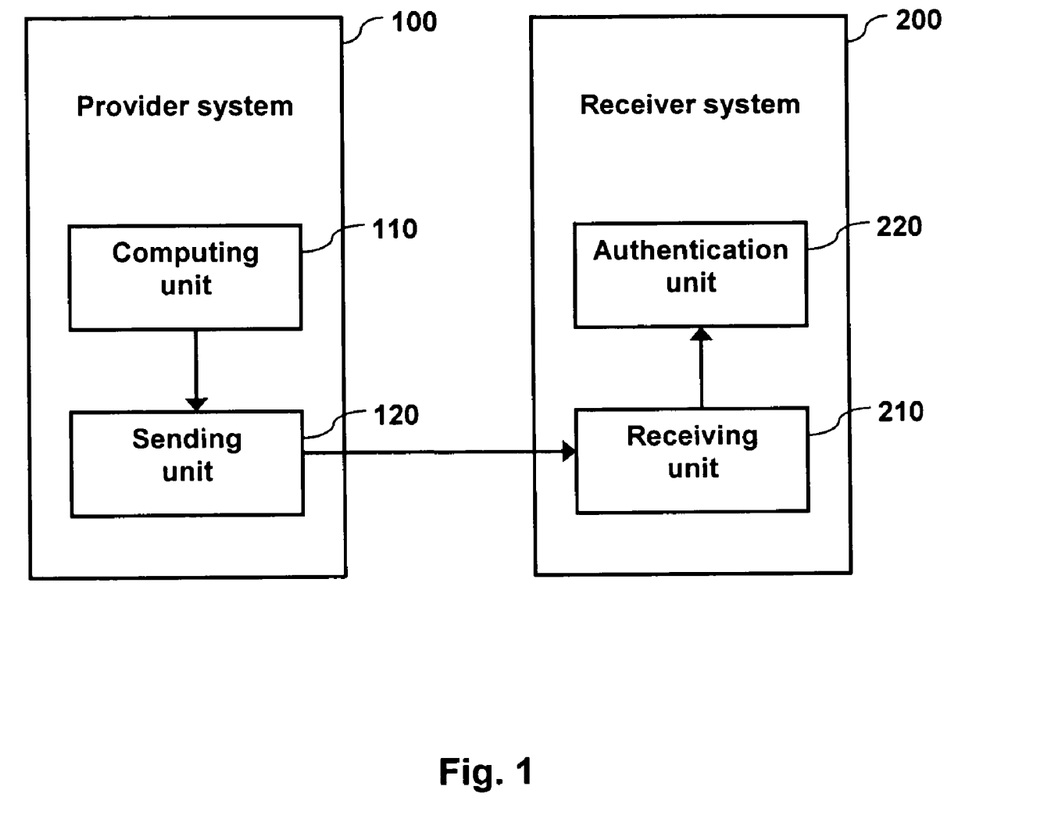
FIG. 1 is a simplified diagram of an exemplary provider system and an exemplary receiver system.

FIG. 1 is a simplified diagram of a provider system 100 and a receiver system 200. The provider system 100 can have two components, a computing unit 110 and a sending unit 120. The receiver system 200 also can have two components, a receiving unit 210 and an authentication unit 220. An arrow between two units in the figure can represent an interface between the two units used for transferring data in the direction indicated by the arrow. The provider system 100 can provide a sequence of public keys to the receiver system 200 in a secure way. Each public key of the sequence can be related to a private key and can be applicable for a public key cryptography (PKC) procedure. The PKC procedure applies a PKC method or algorithm to provide a secure electronic transaction between two parties. The PKC procedure usually means that one party owns or has access to a private key and that the other party owns or has access to a related public key. The private key and the related public key generally are generated together by one computer system according to a PKC method. Therefore, one of the related keys (e.g., the public key) can be transmitted from the one computer system of one party to a further computer system of another party. For a secure PKC procedure between the two parties it is useful to use more than one pair of related keys because a used pair of keys may for example fail to provide a specific security level after some time of usage. With the provider system 100 and the receiver system 200 a sequence of public keys can be transmitted in a secure way, that is, the received public keys can be checked to verify that they are provided by the authentic party.

The provider system 100 can include a computing unit 110 that is configured to generate the sequence of public keys and related private keys. Furthermore, the computing unit can be configured to compute a plurality of data sets with a data set of the plurality including a public key and a proof value. It may also be that one or more further data sets of the plurality each include a further public key and a further proof value. The proof value is a result of applying a hash function to a following data set including a further public key that follows the public key in the sequence. The data set can include the proof value in case that the public key has the further public key following in the sequence, that is, the public key is not the last key of the sequence. The proof value can enable an authorization by the receiver system 200 of the further public key following in the sequence. Further details to data and relations between the data are displayed in following figures and are explained in following parts corresponding to the following figures. The computing unit 110 may be, for example, a processing unit of a computer or it may include, for example, two different computers, one of which generates the sequence of the public keys and related private keys and one of which computes the plurality of data sets. The provider system 100 can further include a sending unit 120 configured to provide the plurality of data sets to the receiver system 200. The sending unit 120, for example, may be included within a computer to which also the computing unit 110 belongs, or the sending unit 120 may be a separate computer system to which a data set is transferred prior to sending the data set to the receiver system 200. In a further example, the sending unit 120 may be implemented as a computer program providing an interface to the Internet. Data can be sent using the interface, and the data can be routed in a standard format through the Internet to an addressed system, that is, the connection to the receiver system may be provided by the Internet. In a further example, an exclusive connection between the provider system and the receiver system may serve as a communication channel for transmitting data between the systems.

The receiver system 200 for authenticating the public keys of the sequence can include the receiving unit 210 that is configured to receive the plurality of data sets from the provider system. The authentication unit 220 of the receiver system can be configured to authenticate the public key of a received data set. For example, this can be done by computing a test hash value by applying a hash function to the data set and by comparing the test hash value with the proof value of a prior data set that includes a prior public key in the sequence. Frequently, the prior data set is received prior to the data set. An identity of the proof value and the test hash value is a positive authentication result and accordingly indicates that the use of the public key for the PKC procedure is secure. Similarly to units of the provider system 100, units of the receiver system 200 may be a part of a computer or a computer system. In a further example, the units may be on different computers and a unit may also include more than one computer. Furthermore, the receiving unit 210 may be a computer program running on a computer with an interface providing a communication channel to the provider system. The communication channel may include the Internet through which received data are routed in the standard format.

Figure 2A:
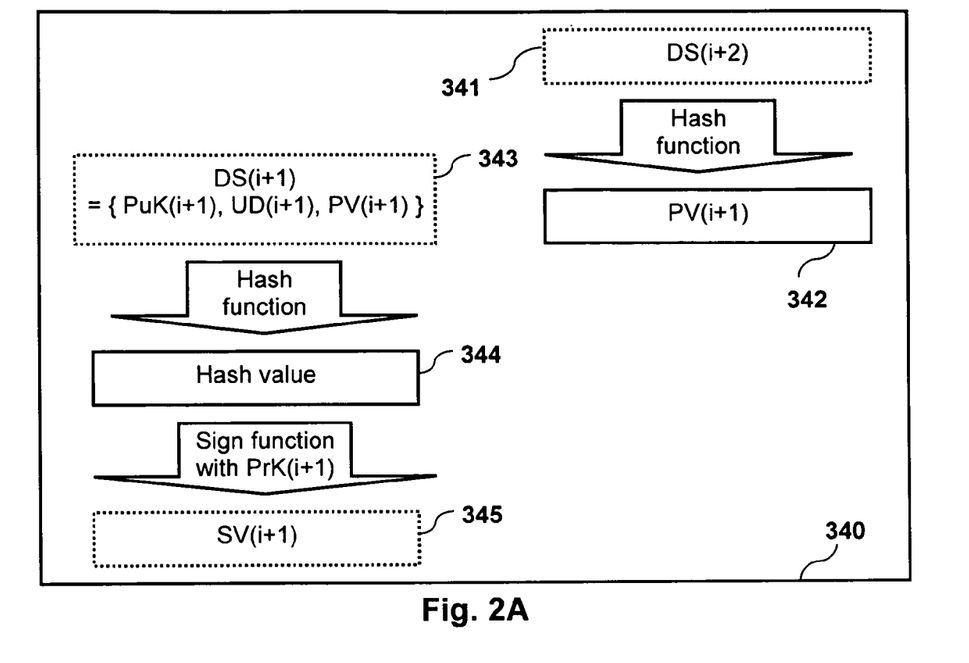
FIG. 2A is a schematic diagram of data and relations between the data used in the provider system.

FIG. 2A is a schematic diagram 340 of data and relations between the data for an implementation of the provider system. The data include a data set DS(i+1) 343 and a following data set DS(i+2) 341. In the figure, data sets are enumerated according to positions of the included public keys in the sequence. The index i represents an exemplary integer value within a range from 1 to m−2, where the sequence has m public values. The data set DS(i+1) 343 includes a public key PuK(i+1) and a proof value PV(i+1) 342. The proof value PV(i+1) 342 is computed by applying the hash function to the following data set DS(i+2) 341. Examples for hash functions are standardized hash functions such as MD4, SHA-256, SHA-512, Snefru, or Tiger. There are further non-standardized hash functions that may be used for an implementation of the implementation.

In the provider system 100, the data set can further include update data that include one or more of the following pieces of information: a date on which the public key of the data set is scheduled to be replaced by a following public key, an identification of a PKC method with which the following key is applicable, a length of the following public key, an identification of the hash function which has been applied to the following data set. In a further implementation the update data may include further data that are related to authenticating provided public keys. Dates for replacing the keys of the sequence as well as further update data can be determined prior to providing a first data set of the sequence. A date may also be associated with a further specification of a time on the date for replacing the keys. However, in an exemplary case a group of public keys may be provided earlier than scheduled for replacing prior public keys. A reason may be that one or more public keys are compromised and therefore insecure. In the exemplary case replacement dates of public keys of the group may not be valid anymore because the public keys are used for replacement earlier than scheduled and the update data may not be changed accordingly. In the figure, exemplary update data are represented by UD(i+1). The update data UD(i+1) may specify, for example, the date on which the public key PuK(i+1) is scheduled to be replaced by a public key PuK(i+2) included in the data set DS(i+2). The update data UD(i+1) may, for example, further specify a PKC method with which the public key PuK(i+1) is applied. The PKC method may be different from a prior PKC method that has been used using a prior public key PuK(i). Such a change of a PKC method may increase a level of security because, for example, at a future point of time it may be useful to use a more sophisticated and more secure PKC that requires more computer resources for the PKC procedure. Similarly, in a further example, a first hash function used for computing a number of proof values may be different from a second hash function used for computing a further number of proof values. In the further example, hash functions that use more computer resources but provide a higher level of security, for example, by being collision-free with a higher level may be used following a future point of time.

Furthermore, in the further implementation of the provider system 100, the computing unit can be configured to compute a signature value, which can be a result of applying a PKC method with a private key to a result of the hash function that has been applied to the data set. The private key can be related to a public key of the data set. In other words, the PKC method can be used as a signing application, that is, for generating a signature for the data set. The sender unit can be further configured to provide the signature value with the data set. As shown in the figure, the hash function can be applied to the data set DS(i+1) 343 to give hash value 344, and applying the PKC method, that is, a sign function with private key PrK(i+1), results in a signature value SV(i+1) 345. In a further example, a signature value may be computed by applying the sign function with the private key PrK(i+1) directly to the data set DS(i+1).

In an example for the provider system, a length of a generated public key of the sequence may be longer than a length of a prior generated public key of the sequence. This may provide a higher level of security in the future than keeping a length of the public keys constant. The reason is that a length that is considered secure today may not be secure, for example, 10 years from now because the available computing power is expected to be higher. As an example, a length of public keys of the sequence may double every five years corresponding to an expected increase of computing resources available to a party for breaking the public key. In the example, keys for the PKC method RSA may have a length of 2048 bits for a start and double accordingly. In the further implementation of the provider system 100, a public key cryptography method with which one public key of the sequence is applicable can be different from a PKC method with which one following public key of the sequence is applicable. Such a change of the PKC method may be conveniently communicated by specifying the applicable PKC method in the update data.

Figure 2B:
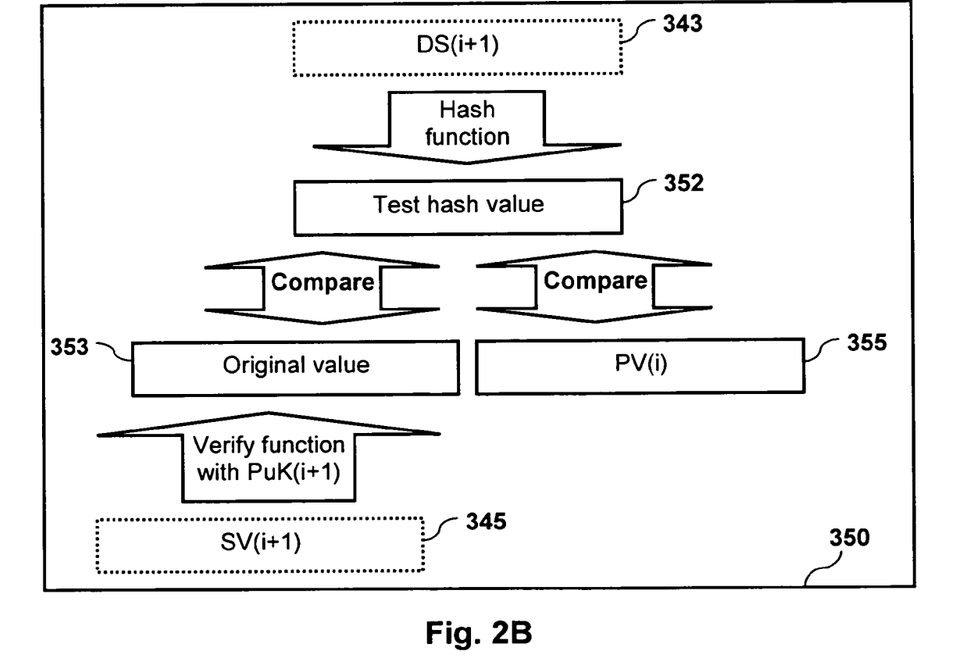
FIG. 2B is a schematic diagram of data and relations between the data used in the receiver system.

FIG. 2B is a schematic diagram 350 of data and relations between the data for an implementation of the receiver system 200. The data include the data set DS(i+1) 343 that are received from the provider system 100 and a prior proof value PV(i) 355 of a previously received data set DS(i).

In the receiver system 200 a test hash value 352 can be computed by applying a hash function to the data set DS(i+1) 343. The test hash value 352 can be compared with the proof value PV(i) 355.

In an example, a received data set may further include update data that include one or more of the following pieces of information: a date on which the public key of the data set is scheduled to be replaced by a following public key, an identification of a public key cryptography method with which the following key is applicable, a length of the following public key, an identification of a hash function which has been applied to a data set following the data set.

The receiving unit of the receiver system can be further configured to receive a signature value with a received data set, and the authentication unit can be configured to authenticate a public key of the received data set by further computing an original value. The original value can be computed from the signature value by applying a PKC method with the public key of the received data set. Authenticating can further include comparing the computed original value to the test hash value of the data set. In the figure, the data set DS(i+1) 343 can be associated with the signature value SV(i+1) 345. In one example, an association between the data set DS(i+1) 343 and the signature value SV(i+1) 345 may be created by a provider system by sending the data set DS(i+1) 343 and the signature value SV(i+1) 345 within one message. In such a case the receiver system 200 can identify the association by identifying the data set DS(i+1) 343 and the signature value SV(i+1) 345 in the message. In another example, the data set DS(i+1) 343 and the signature value SV(i+1) 345 may be sent in separate messages, and the association may be created by a common identifier of both messages. An original value 353 can be created by applying a verify function with the public key PuK(i+1) to the signature value SV(i+1) 345. The original value 353 can be compared to the test hash value 352. The verify function with the PuK(i+1) is complementary to the sign function with PrK(i+1), that is, the verify function decrypts an argument that has been encrypted with the sign function and gives the original argument of the sign function. Such a relation between the verify function and the sign function can be established according to the PKC using a method for encryption and decryption with the related keys.

In the further implementation of the receiver system 200, a length of a public key of the sequence can be longer than a length of a prior public key of the sequence. Also, a PKC method with which a public key of a received data set is applicable can be different from a PKC method with which a further public key of a further received data set is applicable. Both features can increase the security level for the public keys considering a total lifetime of the sequence.

Figure 3:
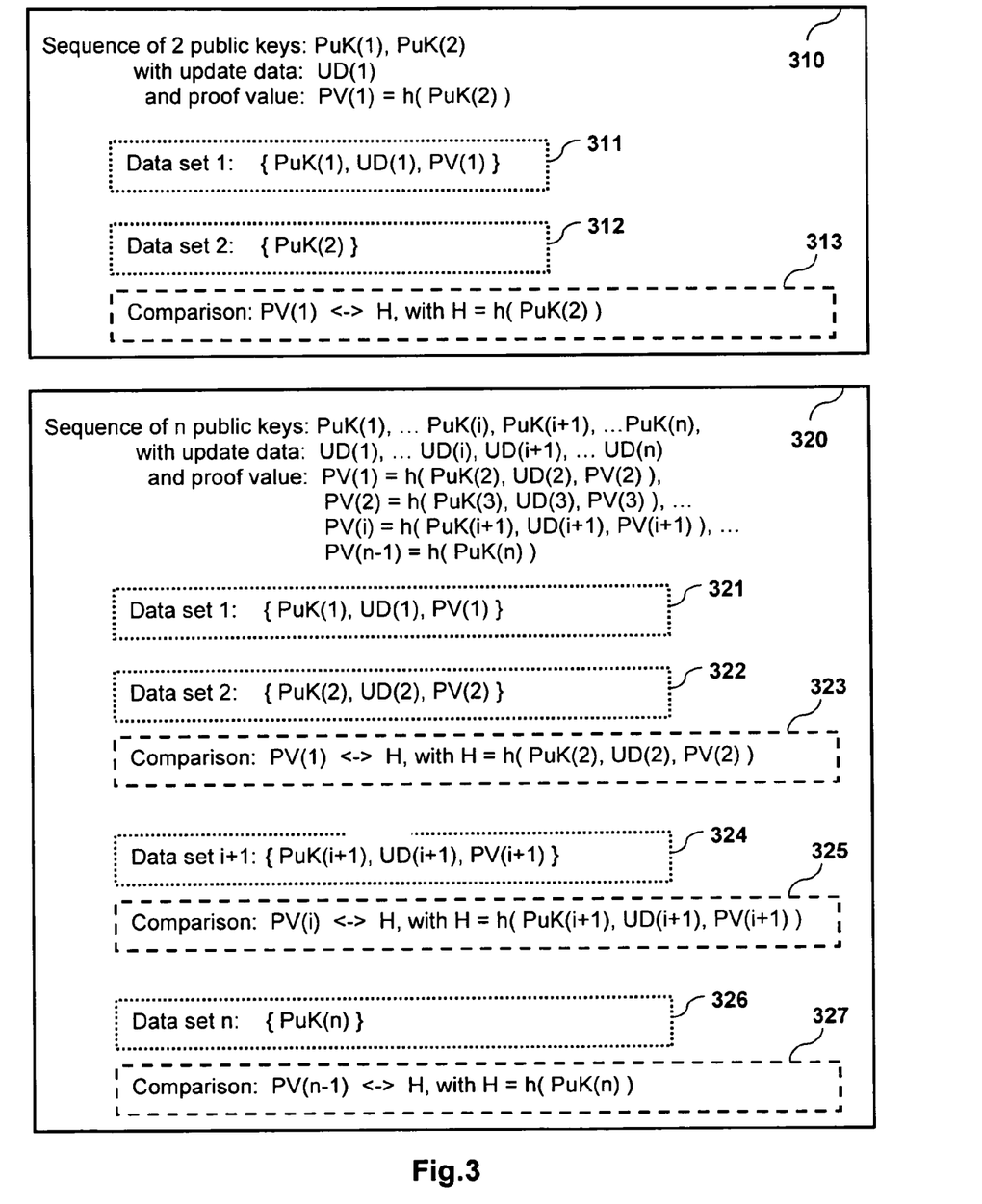
FIG. 3 is a schematic diagram of data and relations between the data.

FIG. 3 shows data and relations between the data. A first part 310 of the data and the relations can be related to a sequence of two public keys provided by an implementation of the provider system 100 and received by the receiver system 200. The first data set 311 can include a first public key PuK(1), update data UD(1), and a proof value PV(1). The first part 310 may not use a signature value for providing an additional security level. In the receiver system 200, the first public key may be authenticated by, for example, using a further communication channel to check the authenticity of the public key PuK(1) as well as of the update data UD(1) and the proof value PV(1). A second data set 312 can provide only a second public key PuK(2) because the second public key PuK(2) is the last public key of the sequence. The second public key PuK(2) can be available for an authentication check 313 that includes a comparison of the proof value PV(1) with a value H that is a result of applying the hash function to the second public key PuK(2). In case that the authentication check fails, that is, if the comparison reveals a difference between the proof value PV(1) and H, the second public key PuK(2) may be considered as insecure. A party using the receiver system 200 may contact a party using the provider system 100, and they may agree how to continue with the PKC procedure. A reason for the failed check may be searched for, or a new sequence of public and private keys may be generated to continue with the PKC procedure.

A second part 320 of the data and the relations can be related to a sequence of n public keys. A part of the proof values and how proof values of the part are related to following proof values is displayed. As an example, the first proof value PV(1) can depend on the second proof value PV(2) that again depends on a third proof value PV(3). Therefore, the first proof value can depend on following proof values up to proof value PV(n−1). This means that prior to providing a first data set 321, public keys and update data of following data sets can be available. Following the first data set 321 a second data set 322 can be provided and received accordingly. A second public key PuK(2) can be authenticated by an authentication check 323 that compares the first proof value PV(1) to a value computed by applying a hash function to the second data set 322. Following data sets are applicable to an authentication check. This is shown for the data set with number (i+1) 324 of which a public key PuK(i+1) can be authenticated by an authentication check 325. A last data set 326 can include a public key PuK(n) that is checked in an authentication check 327. The dates when data sets are provided and dates when public keys replace prior public keys may be scheduled prior to providing the first data set 321. However, it may be desired at a later point of time to depart from the schedule. As an example, it may be that public key number i=42 is used for the PKC procedure but that a next public key used for the PKC procedure is desired to be public key number i=100. A reason may be that public key number i=100 is longer and therefore more secure than prior public keys. In such a case, data sets including public keys with number i=42 to i=100 may be provided sequentially in a short period of time so that public keys with number i=43 to i=99 are not accessed for the PKC procedure. Effectively, public keys for the PKC procedure can be changed from number i=42 to i=100 as is desired. This may be also achieved by putting the data sets including public keys with number i=42 to i=100 into one message and providing the message to the receiver system. The receiver system 200 may check sequentially the data sets included in the message.

Figure 4:
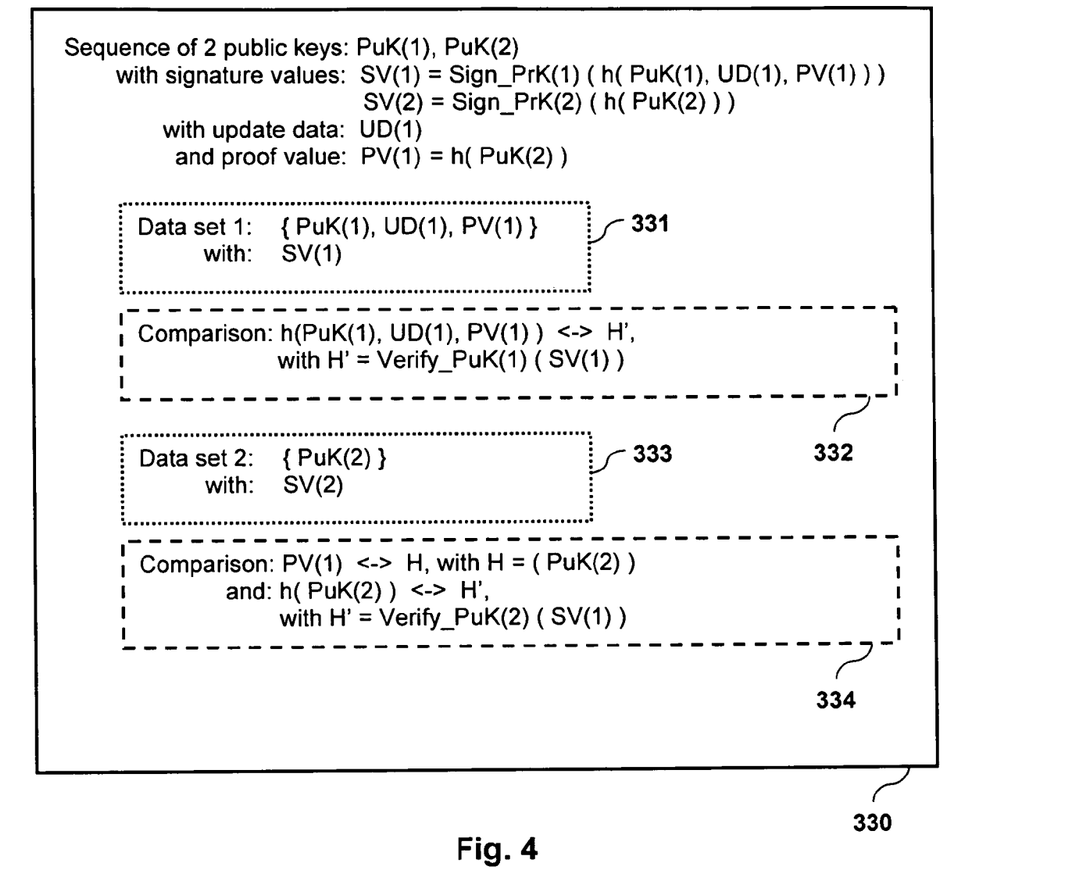
FIG. 4 is a schematic diagram of further examples of data and relations between the data.

FIG. 4 shows a further example 330 of data and relations between data that can include a signature value. The data and relations can belong to a part 330 that is related to a transmission of a sequence of two public keys. A first data set can include a public key PuK(1), an update data UD(1), and a proof value PV(1). The first data set can be provided with a signature value SV(1). An association 331 between the first data set and the signature value SV(1) may be implemented, thus putting the first data set and the signature value SV(1) into one message. A first authentication check 332 can include a comparison of a first test hash value computed by applying a hash function to the first data set with a first original value. The first original value can be computed by applying a verify function with the first private key to the first signature value SV(1). A second association 333 can include a second data set and a second signature value SV(2). A second authentication check 334 can include two comparisons. One comparison can check the authenticity of a second key PuK(2) using the first proof value PV(1) and a further comparison can use the verify function with the second public key PuK(2).

Figure 5:
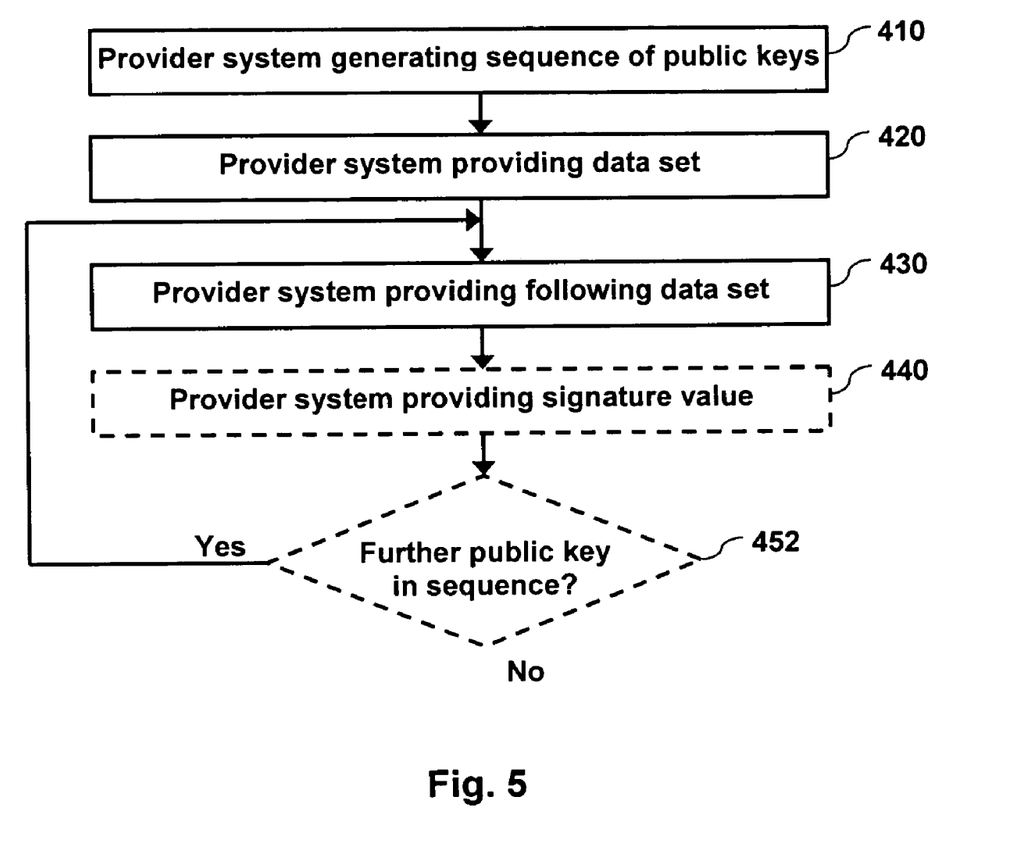
FIG. 5 is a schematic flow diagram of a method for providing a sequence of the public keys to a receiver system.
Figure 6:
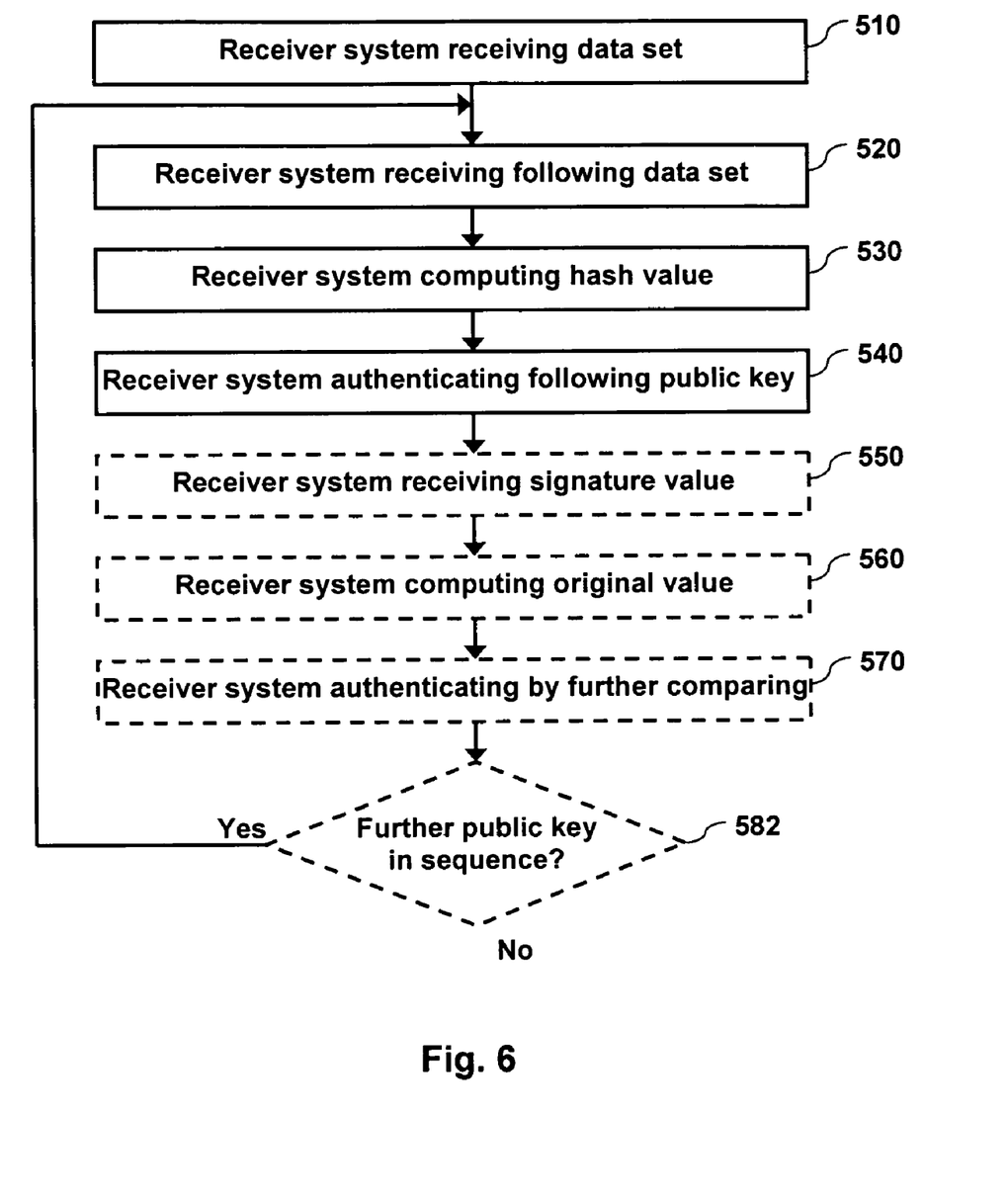
FIG. 6 is a simplified flow diagram of a method for authenticating public keys of a sequence of public keys received from a provider system.

FIG. 5 is a simplified flow diagram of a computer implemented method 400 for providing the sequence of the public keys to the receiver system. The method 400 can include the provider system generating 410 the sequence of the public keys and providing 420 a data set to the receiver system. The data set can include a public key of the sequence that has a following public key in the sequence and a proof value that is a result of applying a hash function to a following data set. The method can further include providing 430 the following data set to the receiver system, where the following data set includes the following public key. In an example, the following data set may further include a following proof value. The following proof value can be a result of applying the hash function to a further following data set including a further following public key in the sequence. In the example, the following proof value is included because the following public key has the further following public key following in the sequence. The method 400 can further include an optional method step providing 440 a signature value for the data set. In FIG. 5 and FIG. 6 optional method steps are represented by dashed lines. The signature value can be a result of applying a PKC method with a private key to a result of the hash function that has been applied to the data set. The private key is related to the public key of the data set. Additionally, providing the signature value can be repeated for a further data set. The further data set can include a further public key that follows previously provided public keys in the sequence. Furthermore, the following data set can include the following proof value that is a result of applying a hash function to the further data set. In an example, the further data set may further include a further proof value, where the further proof value is a result of applying the hash function to a data set including a still further public key following the further key in the sequence. In the example, the further proof value is included because the further public key has the still further public key following in the sequence. The optional method step of providing the further data set can be implemented by checking 452 a condition if a further public key follows in the sequence. If the condition is fulfilled steps 430 and 440 can be repeated. Points of time at which the method steps are repeated may be scheduled prior to providing a first data set including a first public key of the sequence. Periods between the points of time may be, for example, one month.

Provided data sets further can include update data that include data related to authenticating provided public keys. Such update data may for example include an identifier of the PKC method and an identifier of the hash function. As it may be appreciated by a person skilled in the art, steps of the method 400 may be executed in a different order. For example, providing 440 the signature value may be executed prior to providing 430 the following data set.

FIG. 6 is a simplified flow diagram of a computer implemented method 500 for authenticating public keys of the sequence of public keys received from the provider system. The receiver system can receive 510 a data set that includes a public key that has a following public key in the sequence and that includes a proof value being a result of a hash function. The receiver system 200 can receive 520 a following data set that includes the following public key. In an example, the following data set may further include a following proof value that is a result of the hash function. The proof value may be included in case that the following public key has a further following public key following in the sequence. A test hash value can be computed 530 by applying the hash function to the following data set and authenticating 540 the following public key. Authenticating 540 the following key can be done by comparing the proof value of the data set with the test hash value, wherein an identity of the proof value and the test hash value provides a positive authentication result. Additionally, for the following data set, a signature value can be received 550, an original value can be computed 560 from the signature value by applying a public key cryptography method with a public key of the following data set, and the following public key can be authenticated 570 using a further comparison. Authenticating 570 using the further comparison can be done by further comparing the computed original value to the test hash value of the following data set. A positive authentication result means that authenticating steps 540 and 570 give identities of the compared values.

The method 500 can further include that following steps are repeated: receiving a further data set including a further public key, computing a further test hash value by applying a hash function to the further data set, and authenticating the further public key. Furthermore, the following data set can further include a following proof value that can be used for authenticating the further public key. In an example, repetitions of the steps may be done multiple times. Generally, authenticating 540 may be done by comparing a prior proof value included in a prior data set with a test hash value computed from a current data set. The prior data set can include a prior public key in the sequence and the current data set can include a current public key that follows the prior public key in the sequence. Furthermore, the method 500 includes authenticating 570 the further public key by comparing a further original value computed by applying the verify function to the further signature value. The further method step of repeating can be implemented in the method 500 by checking 482 a condition if a further public key follows in the sequence. Therefore, also authenticating 570 by the further comparison can be repeated. An identity of the proof value and the test hash value and an identity of the original value and the test hash value provides a positive authentication result. The further proof value can be included in case that the further public key has a still further public key following in the sequence. The received data set can further include update data that include data related to authenticating public keys of received data sets. Such data may for example include an identification of the public key cryptography method and an identification of the hash function. As it may be appreciated by a person skilled in the art, method steps of method 500 may be executed in a different order. For example, receiving 550 the signature value may be executed prior to receiving 520 the following data set.

Computer program products including instructions that are executable by a computer system and that cause the computer system to execute method steps of the method 400 for providing the sequence may be provided. In a further example, the computer program product may include instructions related to method steps of a further method for providing the sequence. A further computer program product may include instructions that are executable by a computer system and that cause the computer system to execute method steps of the method 500 for authenticating public keys. In a further example, the further computer program product may include instructions related to method steps of a further implementation for authenticating public keys.

An example for a PKC procedure is related to certificates issued by a certification authority. In the example, the certificate includes an identity of a party, a public key issued to the party, and a signature of the certification authority. The party may for example be a person, an organization, or a server. In the example, the signature can be created within the framework of a PKC signing application, that is, the signature can be computed by encrypting the identity of the party and the public key with a private key. The signature enables a further party receiving the certificate to check an authenticity of an association between the public key and the identity from the certificate. Assuming that the public key is authentic the further party can thus check the identity. Pairs of private and related public keys for such an application by the certification authority are also called root keys. The further party desiring to check the authenticity needs the public keys of the root keys provided in a secure way. The further party may for example be a hypertext transfer protocol secure (HTTPS) server used in many banking transactions. In the example, public keys of the root keys of the certification authority can be spread to many further parties in a way as secure as possible and in an automated way. Furthermore, replacing one public key of the root keys with a future public key of the root keys is desired to be secure and automated, too. As an example, the certification authority may generate 1000 root keys to use them for certificates for the next 15 years. The first data set with the first operational public key may be distributed in an established way, for example, by branding it on a smart card and distributing the smart card.

As noted above, computer program products may implement the methods described herein. The computer program products include computer-readable media for carrying or having computer-executable instructions, that is, instructions that are executable by a computer system or for carrying data structures stored thereon. Such computer-readable media may be any available media that can be accessed by a general purpose or special purpose computer. By way of example, such computer-readable media may comprise RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions may include, for example, instructions that have to be processed by a computer to transform the instructions into a format that is executable by a computer. The computer-executable instructions may be in a source format that is compiled or interpreted to obtain the instructions in the executable format. In case that the computer-executable instructions are transformed, a first computer may for example transform the computer-executable instructions into the executable format and a second computer may execute the transformed instructions.

Method steps described herein may be implemented in a computer program product including computer-executable instructions, such as program code, executed by computers in networked environments. Generally, program modules can include routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The techniques described herein may be implemented in a networked environment using logical connections to one or more remote computers having processors. Logical connections may include, for example, a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The techniques may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the techniques described herein can include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations can be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description has been presented for purposes of illustration and description. It is not intended to be exhaustive, and modifications and variations are possible and are within the scope of the following claims.

What is claimed is:

1. A provider system configured to execute instructions recorded on a non-transitory computer-readable storage medium, the provider system for providing a sequence of public keys to a receiver system, wherein each public key of the sequence is related to a private key and is applicable for a public key cryptography procedure, the provider system comprising:
a computing unit configured to:
generate the sequence of public keys and related private keys, and
secure at least a sub-sequence of the sequence of public keys, each public key of the sub-sequence being contained within a corresponding data set of a plurality of data sets, including recursively applying, for each data set and contained public key of the sub-sequence, a hash function to a following data set of the plurality of data sets that includes a further public key, to thereby obtain a proof value for inclusion in each data set of the plurality of data sets; and
a sending unit configured to provide the plurality of data sets to the receiver system.

2. The provider system of claim 1, wherein the data set further comprises update data that include one or more of the following pieces of information: a date on which the public key of the data set is scheduled to be replaced by a following public key, an identification of a public key cryptography method with which the following key is applicable, a length of the following public key, an identification of the hash function that is applied to the following data set.

3. The provider system of claim 1, wherein the computing unit is further configured to compute a signature value that is a result of applying a public key cryptography method with a private key to a result of the hash function that has been applied to the data set, wherein the private key is related to a public key of the data set and wherein the sender unit is further configured to provide the signature value with the data set.

4. The provider system of claim 1, wherein a length of a generated public key of the sequence is longer than a length of a prior generated public key of the sequence.

5. The provider system of claim 1, wherein a public key cryptography method using a public key of the sequence is different from a further public key cryptography method using a further public key of the sequence.

6. A receiver system configured to execute instructions recorded on a non-transitory computer-readable storage medium, the receiver system for authenticating public keys of a sequence of public keys received from a provider system, wherein each public key is related to a private key and is applicable for a public key cryptography procedure, the receiver system comprising:
a receiving unit configured to receive a plurality of data sets from the provider system, wherein each data set of the plurality of data sets includes a public key; and
an authentication unit configured to authenticate each public key of each data set by recursively computing a test hash value by applying a hash function to each data set and by comparing the test hash value with a proof value of a prior data set until all the data sets have been authenticated, wherein an identity of the proof value and the test hash value provides a positive authentication result.

7. The receiver system of claim 6, wherein the data set further comprises update data that comprise one or more of the following information: a date on which the public key of the data set is scheduled to be replaced by a following public key, an identification of a public key cryptography method with which the following key is applicable, a length of the following public key, an identification of a hash function which has been applied to a data set following the data set.

8. The receiver system of claim 7, wherein a length of a public key of the sequence is longer than a length of a prior public key of the sequence.

9. The receiver system of claim 6, wherein the receiving unit is further configured to receive with the data set a signature value and wherein the authentication unit is configured to authenticate the public key of the data set by further computing an original value from the signature value by applying a public key cryptography method using the public key and by comparing the computed original value to the test hash value of the data set.

10. The receiver system of claim 6, wherein a public key cryptography method using a public key of a received data set is different from a further public key cryptography method using a further public key of a further received data set.

11. A computer implemented method for providing a sequence of public keys to a receiver system, wherein each public key of the sequence is related to a private key and is applicable for a public key cryptography procedure; the method comprising:
    generating, using the computer, the sequence of public keys;
    securing, using the computer, at least a sub-sequence of the sequence of public keys, each public key of the sub-sequence being contained within a corresponding data set of a plurality of data sets, including recursively applying, for each data set and contained public key of the sub-sequence, a hash function to a following data set and an included following public key of the sub-sequence, to thereby recursively obtain a corresponding proof value for inclusion in each data set of the sub-sequence; and
    providing, using the computer, the plurality of data sets to the receiver system.

12. The method of claim 11 wherein step of providing the data set to the receiver system is repeated for a further data set comprising a further public key and wherein the following data set further comprises a following proof value that is a result of applying a hash function to the further data set.

13. The method of claim 11, wherein the data set further comprises update data that comprise data related to authenticating provided public keys.

14. The method of claim 11, further providing for the data set a signature value that is a result of applying a public key cryptography method using a private key to a result of the hash function that has been applied to the data set, wherein the private key is related to the public key of the data set.

15. A computer implemented method for authenticating public keys of a sequence of public keys received from a provider system, wherein each public key is related to a private key and is applicable for a public key cryptography procedure; the method comprising:
    receiving, using the computer, a first data set that comprises a first public key that has a following public key in the sequence and that further comprises a proof value that is a result of a hash function;
    receiving, using the computer, a following data set that comprises the following public key;
    computing, the computer, a test hash value by applying the hash function to the following data set;
    authenticating, using the computer, the following public key by comparing the proof value of the data set with the test hash value; wherein an identity of the proof value and the test hash value provides a positive authentication result; and
    recursively executing the steps of receiving, computing, and authenticating for further-received data sets until a plurality of data sets corresponding to a secured sub-sequence of the public keys have been authenticated.

16. The method of claim 15, wherein a received data set further comprises update data that include data related to the authentication of public keys of received data sets.

17. The method of claim 15, further comprising receiving for the following data set a signature value, computing an original value from the signature value by applying a public key cryptography method using the following public key of the following data set, and authenticating the following public key by further comparing the computed original value to the test hash value of the following data set.

18. A computer program product comprising instructions that are recorded on a non-transitory computer-readable storage medium and executable by a computer system for causing the computer system to:
    generate a sequence of public keys, wherein each public key of the sequence is related to a private key and is applicable for a public key cryptography procedure;
    secure at least a sub-sequence of the sequence of public keys, including providing a corresponding plurality of data sets to the receiver system, each data set of the plurality of data sets comprising a public key of the sub-sequence of public keys and a proof value that is a result of applying a hash function to a following data set of the plurality of data sets; and
    provide the plurality of data sets to the receiver system.

19. A computer program product comprising instructions that are recorded on a non-transitory computer-readable storage medium and executable by a computer system and that cause the computer system to:
    receive a first data set from a provider system that comprises a first public key, wherein the first data set includes a following public key in a sequence of public keys, wherein each public key is related to a private key and is applicable for a public key cryptography procedure, and wherein the first data set further includes a proof value that is a result of a hash function;
    receive a following data set that comprises the following public key;
    compute a test hash value by applying the hash function to the following data set;
    authenticate the following public key by comparing the proof value of the data set with the test hash value; wherein an identity of the proof value and the test hash value provides a positive authentication result: and
    recursively receive, compute, and authenticate further-received data sets until a plurality of data sets corresponding to a secured sub-sequence of the public keys have been authenticated.

* * * * *